Aug. 2, 1938. E. A. RING 2,125,650
OPTICAL OCCLUDER
Filed Dec. 12, 1936
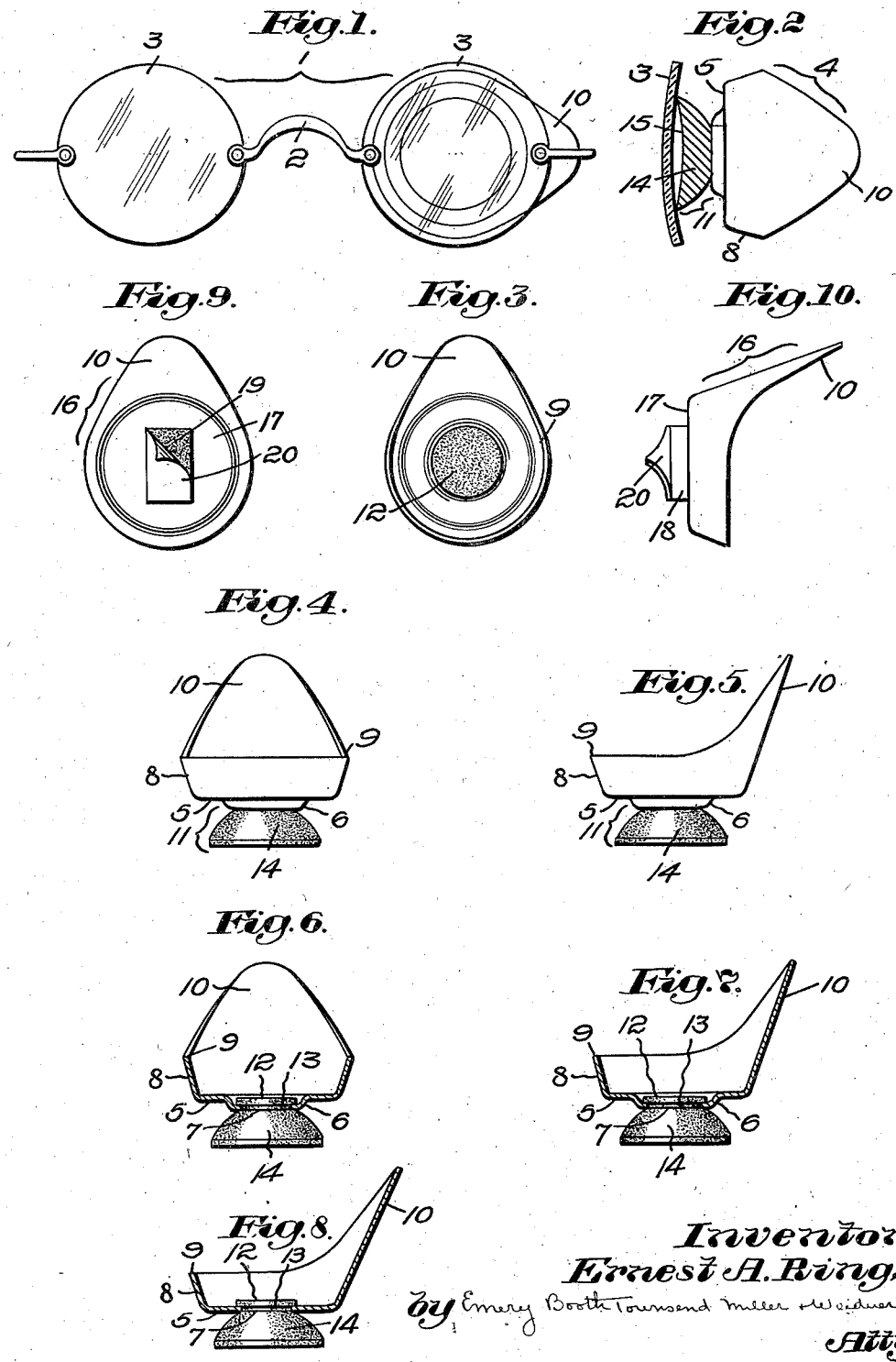
Inventor:
Ernest A. Ring,
by Emery Booth Townsend Miller Weidner
Attys Patented Aug. 2, 1938

2,125,650

UNITED STATES PATENT OFFICE 2,125,650

OPTICAL OCCLUDER

Ernest A. Ring, Providence, R. I., assignor of one-half to Francis M. Blakeney, East Providence, R. I.

Application December 12, 1936, Serial No. 115,570

5 Claims. (Cl. 2—15)

This invention relates to optical occluders; that is, to devices that are intended to exclude light from an eye of the user for some purpose, as, for example, if the eye has been injured. The occluder is primarily intended to be attached to a face of a lens of spectacles, eye-glasses or the like.

In order that the principle of the invention may be readily understood, I have disclosed two embodiments thereof in the accompanying drawing, wherein—

Fig. 1 is a plan view of a pair of spectacles or eye-glasses having one of my occluders applied thereto;

Fig. 2 is a view in vertical section through a lens of the spectacles or eye-glasses, and showing the occluder attached thereto by a suction element in accordance with the preferred embodiment of my invention;

Fig. 3 is a plan view of the occluder;

Fig. 4 is a side elevation thereof;

Fig. 5 is a view similar to Fig. 4 but taken at right angles to Fig. 4;

Figs. 6 and 7 are vertical sections similar to Figs. 4 and 5 respectively;

Fig. 8 is a view similar to Fig. 6, but showing the occluder as having an entirely flat basal portion; and Figs. 9 and 10 are respectively a plan view and a side elevation of a modified form of my invention in which the occluder is attached by adhesive instead of by suction to a lens of the spectacles or eye-glasses.

Occluders have previously been provided for use in connection with spectacles or eye-glasses, but so far as I am aware they have always heretofore been attached either to the rim of the lens or to the temples or portions of the spectacles that extend over the ears of the wearer. This has necessitated a complicated construction which it is one of the purposes of my invention to avoid. So far as I am aware, I am the first to apply an occluder directly to a face or side of a lens of spectacles or eye-glasses or the like, and therefore I desire to claim the same broadly. It is evident that the occluder may, within the broad scope of my invention, be applied or attached in different ways directly to a face or side of the lens. Desirably I provide suitable means whereby the occluder is adapted to be attached by suction to a face or side (preferably the inner face or side) of a lens of spectacles or eye-glasses. Such a construction permits the very ready disassociation or separation of the occluder from the lens at any time. I may, however, provide other means for attaching the occluder directly to a face or side of the lens, as, for example, by the use of some adhesive, such as cement. I will specifically describe and claim said two forms of my invention, but it is to be understood that any other suitable means for attaching the occluder directly to a face or side of the lens of spectacles or eye-glasses may be employed within the scope of my invention.

Referring first to that preferred embodiment of my invention shown in Figs. 1 to 8 inclusive, a pair of spectacles or eye-glasses is indicated generally at 1 in Fig. 1, the same having a nose piece 2 and lenses 3.

The occluder itself, indicated generally at 4, may be formed of any suitable material, as, for example, celluloid, one type of which is known as "Zylo." It may, however, be formed of metal or any other desired material.

The occluder indicated generally at 4 is provided in this selected embodiment of my invention with a substantially flat basal portion 5, indicated clearly in each of Figs. 2, 4, 5, 6, 7. In each of said figures, I have indicated a slight downward swell 6 centrally positioned with respect to the perimeter of said basal portion and surrounding an opening 7 of substantial diameter. Said basal portion 5 is surrounded by a rim 8 at a suitable inclination thereto and preferably of substantially the shape and extent indicated, so that the edge 9 of said rim, when the device is in use, contacts with the portion of the face immediately surrounding the eye from the nose out to the temple where the prolongation 10 of the rim is of such extent as to cut off all the light at that point.

Desirably, the occluders are made in different sizes and of somewhat different conformations to suit the individuality of the face of the user purchasing the same.

The suction element employed by me in the preferred embodiment of the invention is desirably structurally separate or distinct from the remainder of the occluder, but within the scope and purpose of my invention it may be structurally integral therewith, in which case the entire occluder would be of rubber or some material having the necessary characteristics for my purpose.

As herein indicated, I provide a separate suction element indicated in its entirety at 11. The same is shown as provided with a head 12, a neck 13 and a body portion 14 which, as indicated in Fig. 2 at 15, is concaved in such a manner that when the occluder has been positioned as shown in the several figures, by forcing the head 12 through the opening 7, the concaved face 15 may be pressed with sufficient force against the inner face of the lens 3 as to remain in contact therewith, owing to the force of suction.

It will be observed, viewing Figs. 6 and 7, that the top of the head 12 is substantially flush or slightly below the level of the inner face of the basal portion 5, owing to the provision of the annular swell 6.

I may, however, form said basal portion 5 as a wholly flat member, as indicated in Fig. 8, in which case the head 12 will extend in a similar manner through the opening 7, but to a point above the inner face of the flat basal portion provided in Fig. 8.

The suction element 11 is composed, preferably of rubber, so prepared or treated and of such degree of hardness, that it will perform its suction function effectively.

In Figs. 9 and 10, I have indicated the occluder generally at 16, the same having a flat base portion 17 devoid of any opening corresponding to the opening 7 of the preferred form of my invention. Suitably attached to the lower or outer face of said base portion 17, as by some suitable cement or other adhesive, is secured a pad 18 itself preferably but not necessarily of rubber, and to the outer face of which is applied a suitable adhesive, best indicated at 19 in Fig. 9. Temporarily overlying and protecting said adhesive 19 is a small piece of suitable tape 20 indicated in Fig. 9 as turned back at one corner and which is made of any suitable material. The occluder of this type of my invention is preferably sold with the tape 20 overlying and protecting the adhesive 19. When the purchaser wishes to use the occluder, he detaches the tape 20 and presses the pad 18 of the occluder firmly against the lens of the spectacles or eye-glasses until the adhesive 19 causes it to become firmly attached to the lens. Obviously, this form of the occluder may also be readily detached from the face of the lens when it is no longer necessary or desired to use the occluder. If desired, the outer face of the pad 18 may be rounded or convexed to fit more completely to the face of the lens.

I have stated that the occluder is desirably attached to the inner face of a lens of the spectacles or eye-glasses. Within the broad scope of my invention, the device might be similarly applied to the outer face of the lens, but in such case it would be necessary to provide a differently shaped rim for the occluder and one which would render the same more cumbersome and expensive. It is, therefore, highly desirable that the occluder be provided with means for attaching the same to the inner face of a lens of the spectacles or eye-glasses. It will be evident from the foregoing that in both forms of the occluder herein represented, I have provided means to cause the occluder to adhere directly to the inner face of the lens of the spectacles or eye-glasses. In the preferred form of the invention, the means to cause adherence is a suction creating means, which, as heretofore pointed out, may be structurally integral with the basal portion or may be structurally separate therefrom but attached thereto. In the other form of the invention, the means for causing adherence resides in the fact that the basal portion has a surface adhesive for attaching the occluder directly to a face of the lens. In both forms of my invention, the occluder with its basal portion and surrounding rim is of a hollow form adapting it to be fitted about the eye and to engage the face about the eye by said rim. Obviously the occluder may be embodied in different forms so long as it has the features of my invention.

It is clear from the foregoing description that the device is of simple character and that the same can be inexpensively made, but nevertheless it meets all the requirements of an optical occluder.

Having thus described two illustrative embodiments of the invention, it is to be understood that although specific terms are employed, they are used in a generic and descriptive sense and not for purposes of limitation, the scope of the invention being set forth in the following claims.

I claim:—

1. As a new article of manufacture, an occluder or device for excluding light from an eye of the user, said device having a basal portion with a face-engaging rim, said device also having means for attaching the same by suction directly to a lens of spectacles, eye-glasses or the like, said attaching means constituting the sole attaching means for said occluder.

2. As a new article of manufacture, an occluder or device for excluding light from an eye of the user comprising a substantially flat basal portion and a surrounding rim at an inclination thereto, which is toward the face of the user, so as to engage the face directly about the eye of the user, said device having an element provided with means for attaching the same directly to a face of a lens of spectacles, eye-glasses or the like inside the rim or periphery thereof and constituting the sole attachment between the occluder and said lens.

3. As a new article of manufacture, an occluder or device for excluding light from an eye of the user comprising a substantially flat basal portion and a surrounding rim at an angle thereto, to engage by its edge the face directly about the eye of the user, said basal portion having an opening therein and a suction element fitted into said opening, and having its suction portion extending beyond the plane of said basal portion, so that said suction element may be applied directly to and attached by suction to a face of the lens of specacles or eye-glasses.

4. As a new article of manufacture, an occluder or device for excluding light from an eye of the user, comprising a basal portion and a surrounding rim at an inclination thereto, which is toward the face of the user, so as to engage the face about the eye of the user, said basal portion having a structure with a surface adhesive for attaching said occluder directly to a face of a lens of spectacles or eye-glasses.

5. As a new article of manufacture, an occluder or device for excluding light from an eye of the user, the same having a basal portion to be applied directly to and thereby to be attached to a face of a lens of spectacles or eye-glasses, the face of said portion to be so applied itself having a suction element connected thereto and which constitutes the means for securing the occluder to the lens.

ERNEST A. RING.